(12) United States Patent
Barreau (10) Patent No.: US 9,829,938 B2
(45) Date of Patent: Nov. 28, 2017

(54) MOUNTING SYSTEM FOR STORAGE MEDIA

(71) Applicant: ARRIS Global Ltd., Bradford, West Yorkshire (GB)

(72) Inventor: Jerome Barreau, Carrieres sur Seine (FR)

(73) Assignee: ARRIS Global Ltd., West Yorkshire (GB)

( * ) Notice: Subject to any disclaimer, the term of this patent is extended or adjusted under 35 U.S.C. 154(b) by 0 days.

(21) Appl. No.: 14/889,394

(22) PCT Filed: May 12, 2014

(86) PCT No.: PCT/GB2014/051440
§ 371 (c)(1),
(2) Date: Nov. 5, 2015

(87) PCT Pub. No.: WO2014/184524
PCT Pub. Date: Nov. 20, 2014

(65) Prior Publication Data
US 2016/0103471 A1    Apr. 14, 2016

(30) Foreign Application Priority Data

May 13, 2013   (GB) .................................. 1308567.5

(51) Int. Cl.
*G06F 1/16* (2006.01)
*G06F 1/18* (2006.01)
*G11B 33/12* (2006.01)

(52) U.S. Cl.
CPC ............ *G06F 1/187* (2013.01); *G11B 33/124* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,325,263 | A * | 6/1994 | Singer | ..................... G06F 1/184 361/679.39 |
| 5,828,547 | A * | 10/1998 | Francovich | ............. G06F 1/184 361/679.39 |
| 6,388,875 | B1 | 5/2002 | Chen | |
| 8,289,691 | B2 * | 10/2012 | Peng | ..................... G11B 33/127 248/27.3 |
| 8,976,530 | B2 * | 3/2015 | Jeffery | ................... G11B 33/02 361/679.33 |
| 2006/0023413 | A1 | 2/2006 | Lo et al. | |

(Continued)

FOREIGN PATENT DOCUMENTS

| | | |
|---|---|---|
| EP | 2426667 | 3/2012 |
| WO | WO2007126239 | 11/2007 |

*Primary Examiner* — Lisa Lea Edmonds
(74) *Attorney, Agent, or Firm* — Bart A. Perkins (57) ABSTRACT

Apparatus is provided in which digital data is processed and the apparatus including processing means for processing received and/or stored data, a data storage media can be selectively mechanically located with said apparatus via mounting means to allow the transfer of the data between the storage media and the processing means when connected. The mounting means includes one or more biasing means to ensure that the storage media, when inserted into the mounting means, is moved into the required location for connection to the power and/or data connection means of the apparatus.

12 Claims, 7 Drawing Sheets

(56) References Cited

U.S. PATENT DOCUMENTS

| | | | |
|---|---|---|---|
| 2006/0139871 A1* | 6/2006 | Chen | G06F 1/184 361/679.39 |
| 2007/0274034 A1* | 11/2007 | Yang | G06F 1/187 361/679.39 |
| 2008/0089021 A1* | 4/2008 | Deng | G06F 1/187 361/679.39 |
| 2011/0005068 A1 | 1/2011 | Zhang et al. | |

* cited by examiner

MOUNTING SYSTEM FOR STORAGE MEDIA

The invention to which this application relates is apparatus which allows the mounting in position of a storage media, such as a hard drive disk (HDD), in apparatus with which the storage media is required to interact in order to transfer data between the storage media and the apparatus. This transfer of data allows, in a first direction, the storage of data onto the storage media and, in the opposing direction, the retrieval and transfer of data from the storage media to the apparatus to allow the same to be processed and subsequently used. One form of apparatus with which this type of storage media is particularly useful is apparatus which is provided to allow for the reception of digital data such as video and/or audio data, and the processing of the same to generate video and/or audio for a user via a display screen and speakers connected to the apparatus. Such apparatus is conventionally known as a set top box or broadcast data receiver.

In the use of this form of apparatus, there is a need to be able to store received data so that the same need not be used and processed to generate video and/or audio at the time of reception, but rather, can be stored and used subsequently when the user desires to watch and/or listen to the same. Most typically, the data is stored in a manner so as to allow the recreation of an identifiable radio or television programme so as to allow that television or radio programme to be selected by the user.

Typically, there are two forms in which the storage media can be provided, a first form in which the storage media is provided as an integral unit of the apparatus and therefore housed within the outer housing of the apparatus. In this case, the use and size of the storage media is limited to that which is installed at the time of manufacture of the apparatus. In a second form, it is possible to provide connection means to or within the housing of the apparatus such that when connected thereto, the storage media acts as part of the apparatus but can also be removed from the apparatus to allow the same to be installed and used with other apparatus and/or to allow an alternative storage media, perhaps one with a greater capacity, to be connected in its place. It is to this latter form of the apparatus that the current invention relates as it is increasingly common that users wish to have a storage media, which they can selectively use with different forms of apparatus and/or with apparatus at different locations. Furthermore, there is an increasing demand to be able to upgrade the storage media to have a greater capacity and/or faster processing power.

In each case, the connection means between the storage media and the apparatus typically include a power connection to allow electrical power to be provided to operate the storage media and one or more data connections which allow the transfer of data between the apparatus and the storage media. In addition, there is a need to be able to correctly mechanically locate the storage media with the apparatus. A problem which is experienced conventionally is that the storage media can be provided of different dimensions and in particular thicknesses. This means that either the apparatus can only be used with certain storage media of the same dimension or relatively complex mechanical mounting means are required to be used which are required to be adjusted for different storage media dimensions and which adjustments may be beyond the capability of the user, and/or can be frustrating to the user to an extent that the ability to replace and use different storage means is not utilised.

The aim of the present invention is therefore to provide mounting means which allow the mounting of storage media in engagement with apparatus with which the storage media is required to interact, and to provide the mounting means in a manner which allows the same to be range taking in terms of accepting storage media of different dimensions whilst ensuring that the required connection between the storage media and the apparatus are achieved.

In a first aspect of the invention, there is provided apparatus for the processing of data, said apparatus including processing means for processing received and/or stored data, a data storage media which can be selectively mechanically located and connected with said apparatus via mounting means to allow the transfer of data between the storage media and the processing means when connected, wherein the said mounting means includes biasing means to ensure that the storage media, when inserted into the mounting means, is moved into the required location for connection to power and/or data connection means of the apparatus.

In one embodiment, the biasing means is one or more sprung members which contacts with the storage media directly, or a housing for the storage media, so as to locate the power and/or data connections on the storage media at the required location so as to allow connection with the respective power and/or data connections provided on the apparatus.

In one embodiment the storage media is a hard disk drive.

In one embodiment, the biasing means allows the mounting means to be range taking in that the biasing means allows storage media of different thicknesses within a predefined thickness range to be inserted into the mounting means and still be positioned so as to allow the power and data connections to be achieved.

In one embodiment, the storage media is engaged with an insertion plate which, when the storage media is in position in the apparatus forms an outer face of part of the housing of the apparatus. Typically in this embodiment the storage media is wholly enclosed within the apparatus housing.

Typically the biasing means are provided as part of the mounting means which are located within the housing and into which the storage media is slid.

Typically the power and/or data connections are located at the opposing end of the mounting means from that at which the insertion plate is located. Typically the mounting means are secured in location in the housing.

In one embodiment guide means are provided to guide the sliding movement of the storage media into the mounting means.

In one embodiment the guide means and/or biasing means are located so as to contact the storage media at locations on the storage media which are known to be resistant to damage.

Typically, when the storage media is located in the mounting means the biasing means act to retain the storage media in the correct location during use.

In a further aspect of the invention there is provided mounting means for a data storage media which can be selectively mechanically located with apparatus in which the mounting means is provided wherein the said mounting means includes biasing means to ensure that the storage media, when inserted into the mounting means is moved into and retained in the required location for connection to the power and/or data connection means of the apparatus.

Specific embodiments of the invention are now described with respect to the accompanying drawings wherein.

Figure 1A:
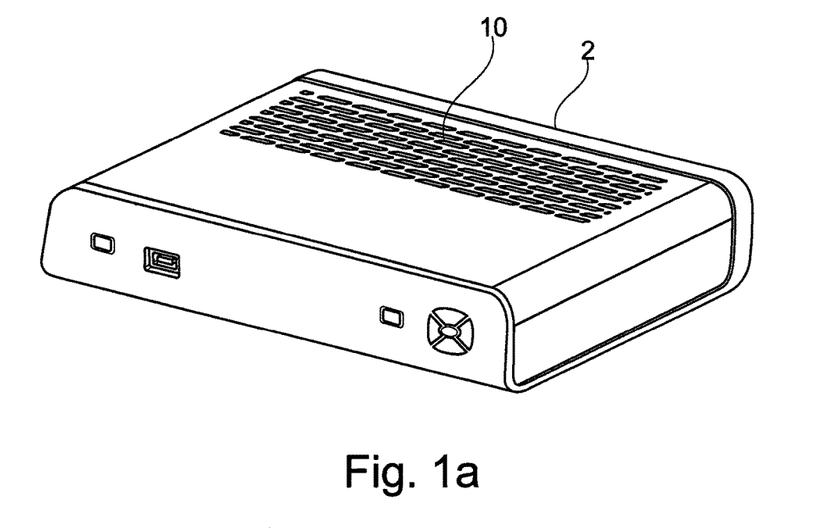
FIGS. 1a and b illustrate a broadcast data receiver in accordance with one embodiment of the invention.
Figure 1B:
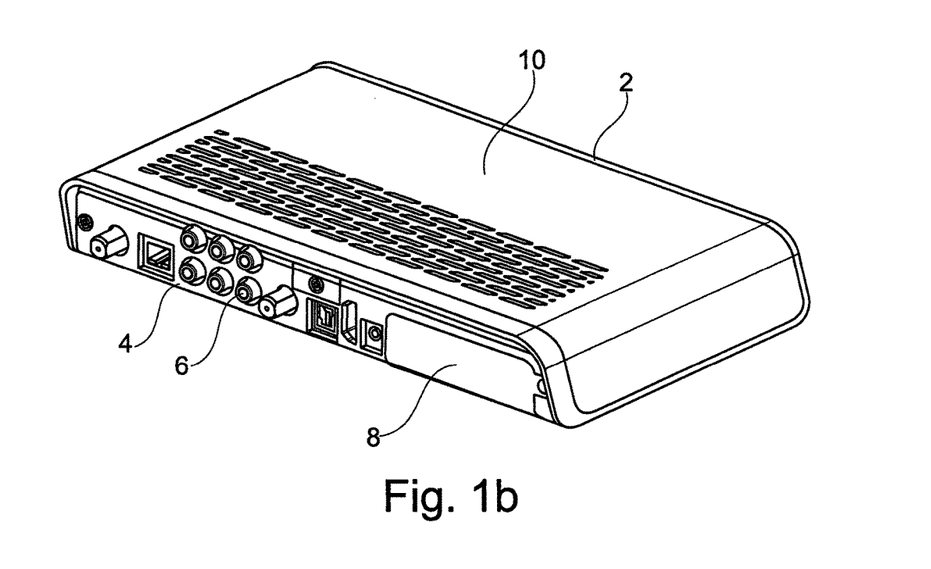
Figure 2A:
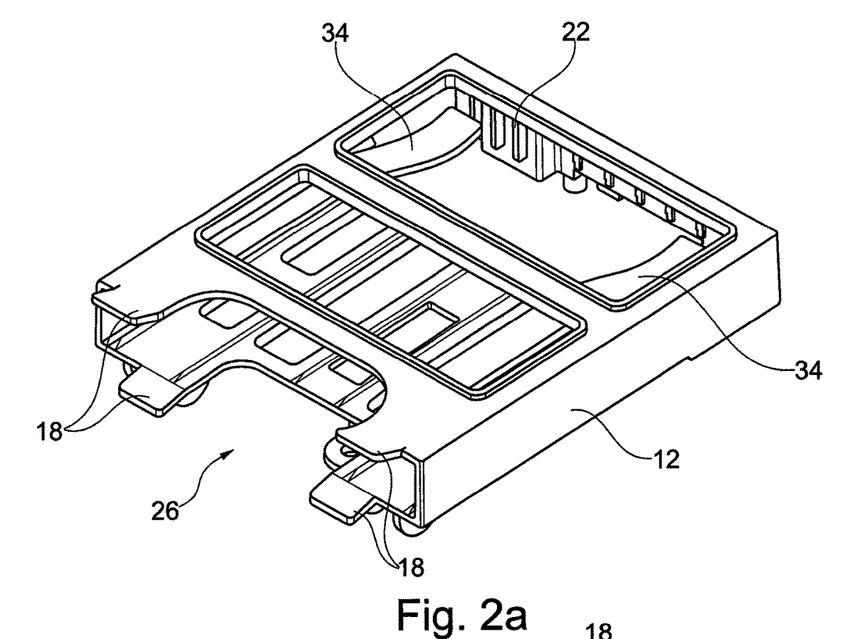
FIGS. 2a and b illustrate a mounting means in accordance with one embodiment of the invention.
Figure 2B:
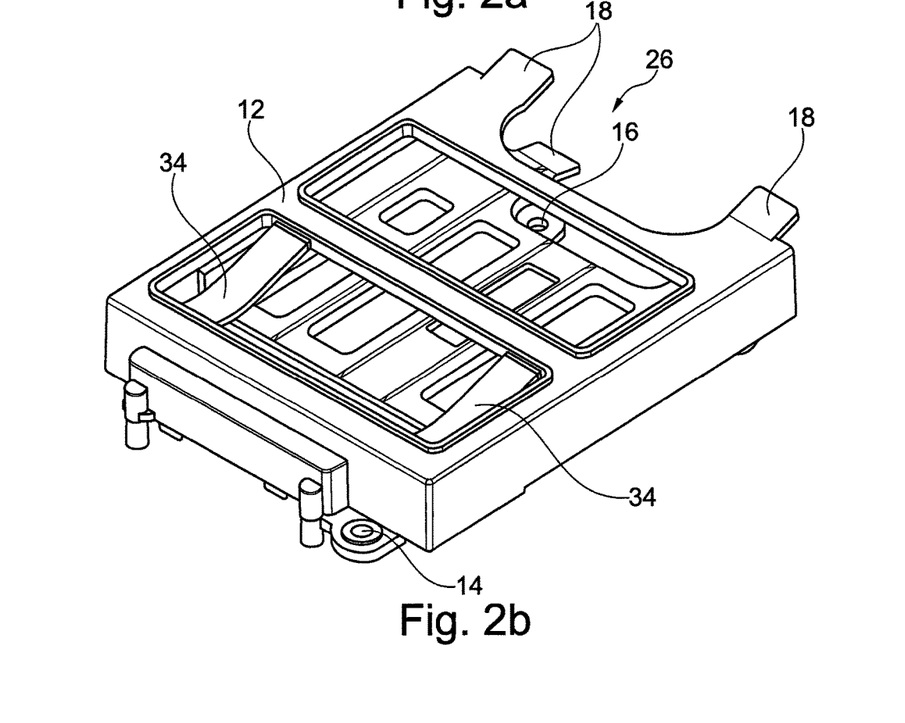
Figure 5:
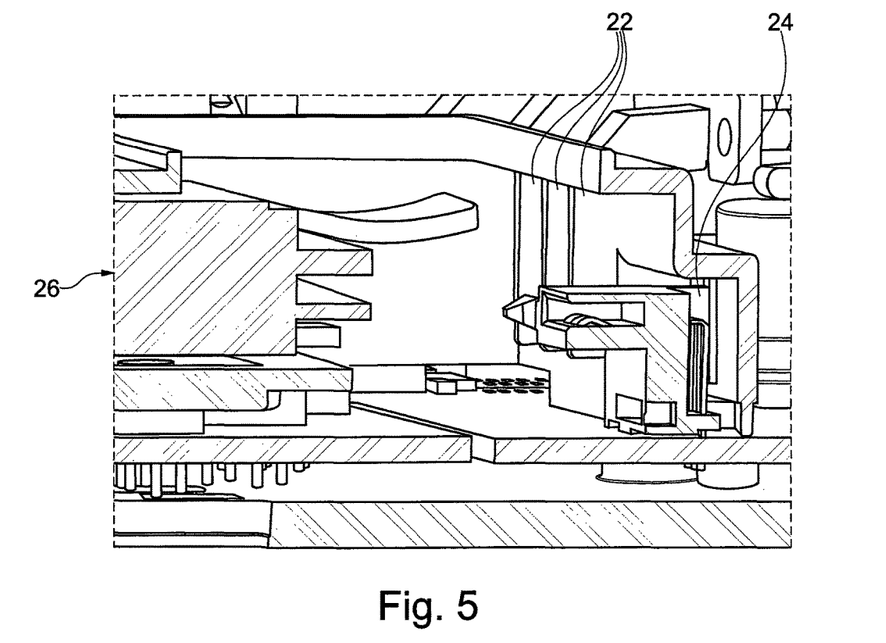
FIG. 5 illustrates protection ribs provided as part of the mounting means of FIGS. 2a and b.

Referring firstly to FIGS. 1a and b there is illustrated apparatus 2 in accordance with one embodiment of the invention in the form of a broadcast data receiver. The apparatus includes processing means (not shown) for processing received and or stored data to allow the generation of video and/or audio therefrom. In this embodiment, at the rear face 4 there are provided a series of connections 6 for various data sources and also an insertion plate 8 for storage media. The insertion plate will be described subsequently but this masks an opening into the housing 10 and in this aperture there is located a mounting means 12 of the type shown in FIGS. 2a and b. The mounting means 12 are secured in position in the housing via screws which pass through the holes 14, 16 and the guide means 18 are located so that they are positioned at the opening 20 of the housing 10. At the opposing end of the mounting means there are provided a number of ribs 22 as shown in FIG. 5 which act to protect the power and/or data connectors 24 of the apparatus from damage when the storage media is inserted into the mounting means in the direction as indicated by arrow 26.

Figure 3A:
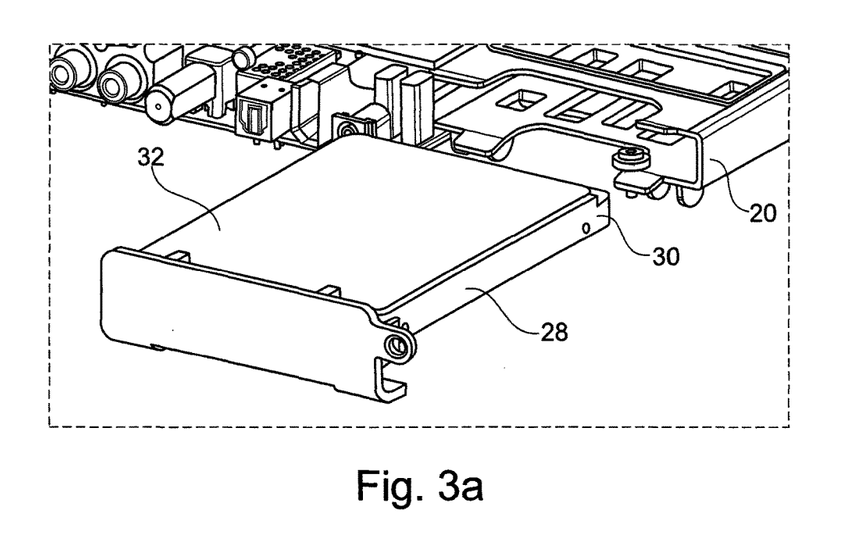
FIGS. 3a-c illustrate the storage media being inserted into the mounting means of FIGS. 2a and b.
Figure 3B:
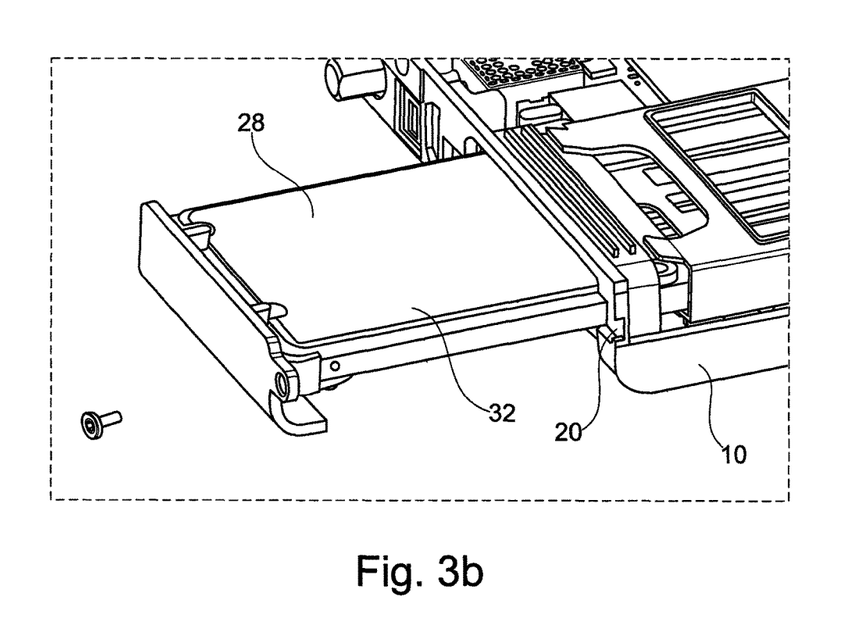
Figure 3C:
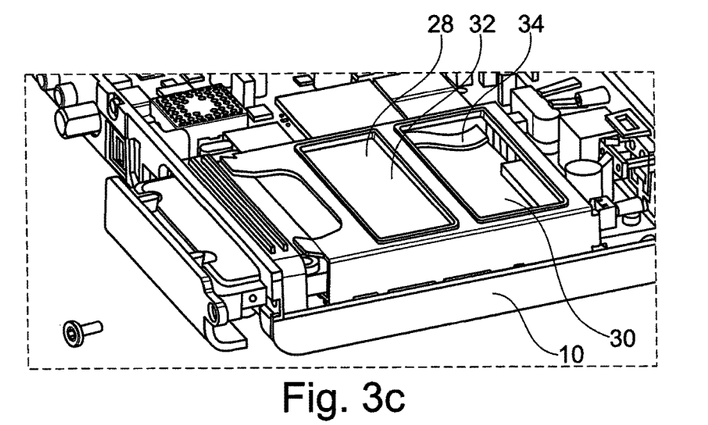

FIGS. 3a-c illustrate the manner in which the storage media 28 is inserted into the mounting means by sliding the same through the opening 20 of the housing 10, part of which is shown in FIGS. 3b and c, and into the mounting means 12. The initial movement of the storage media 28 into the mounting means is guided by guide means 18 and as the leading edge 30 of the storage means is advanced, so the surface 32 of the storage media comes into contact with the biasing means in the form of spring members or arms 34 which are formed so that the free ends of the same depend inwardly into the mounting means cavity into which the storage media 28 is inserted.

Figure 4A:
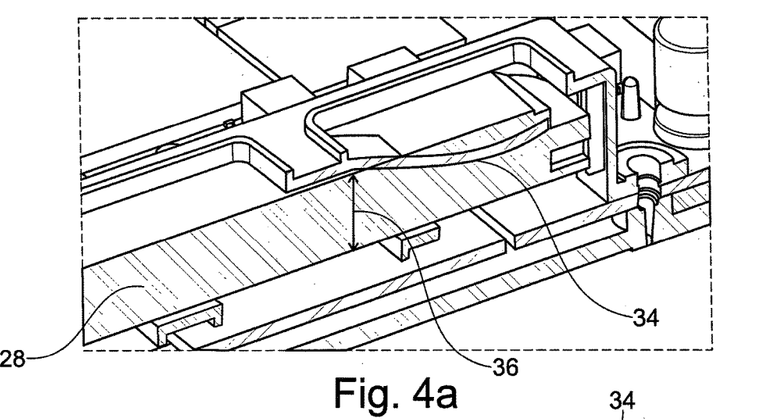
FIGS. 4a and b illustrate the positioning of the biasing means in the mounting means of FIGS. 2a-3c with different thicknesses of storage media located therein.
Figure 4B:
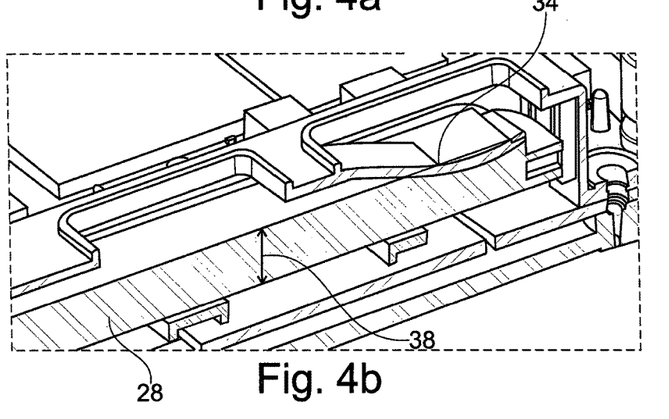

The members 34 act to exert a downward force onto the storage media to ensure that the connectors on the same are in the required plane so as to allow the same to be connected to the power and/or data connectors 24 of the apparatus and retained in that position. FIG. 4a illustrates a storage media which has a thickness 36 in position and in contact with the spring members 34 and FIG. 4b illustrates a storage media 28 with a thickness 38 in position and it will be seen that the members 34 depend further inwardly when the storage media has a reduced thickness so as to ensure that the storage media is in and is retained in the required location.

Figure 6A:
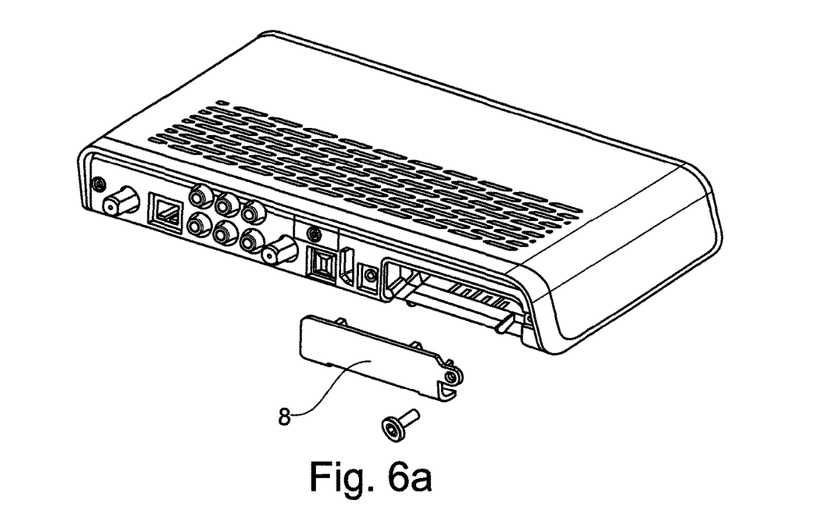
FIGS. 6a-d illustrate the provision of an insertion plate with the storage media in accordance with one embodiment of the invention.
Figure 6B:
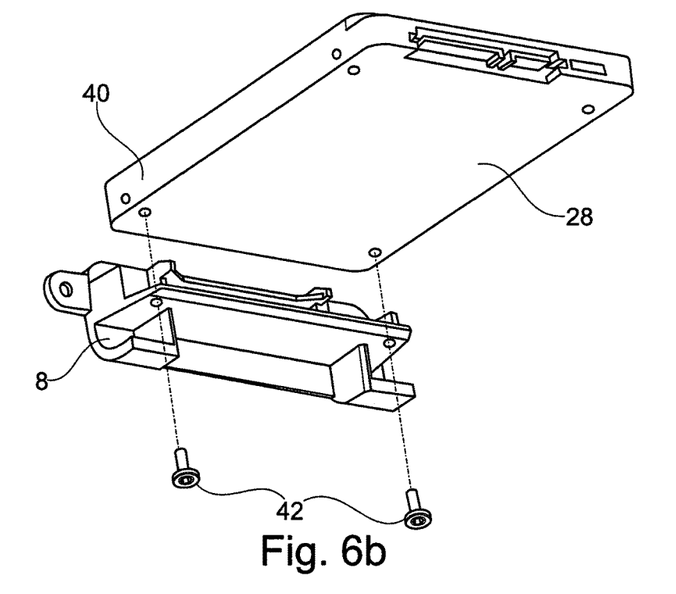
Figure 6C:
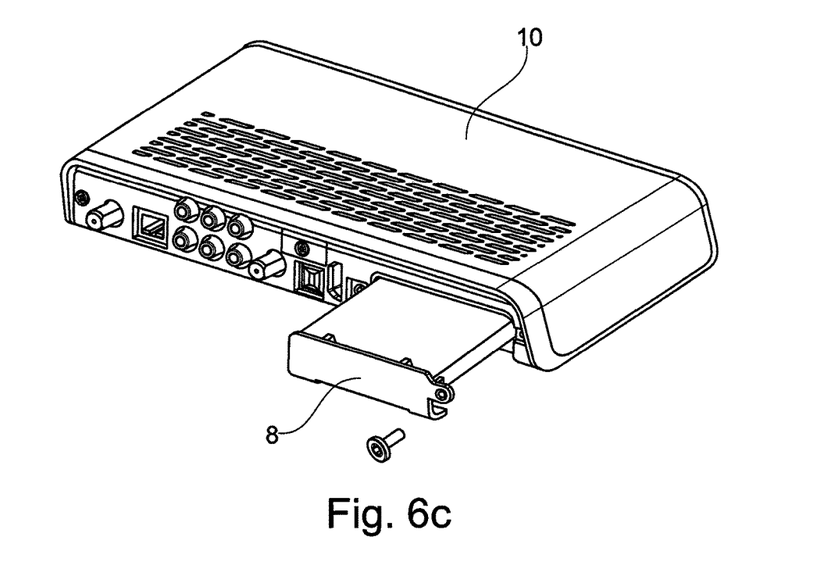
Figure 6D:
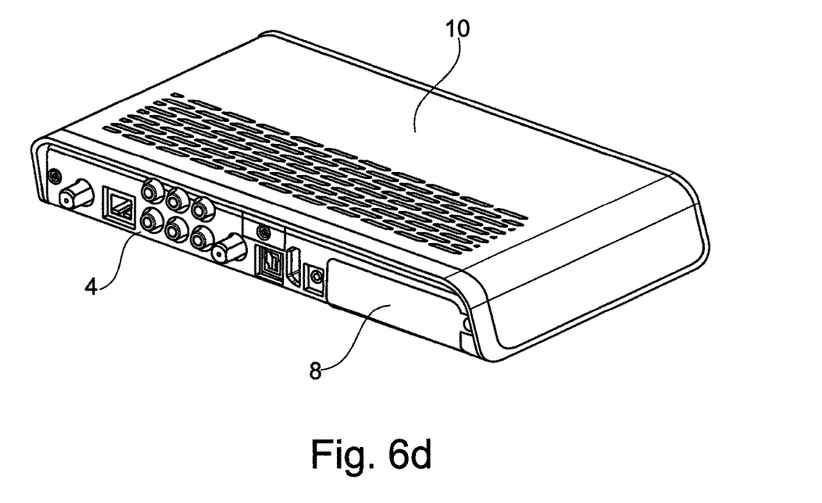

Referring now to FIGS. 6a-d there is illustrated the manner in which the insertion plate 8 is located onto the trailing end 40 of the storage media 28 via screws 42. the storage media can then be slid into position as shown in FIG. 6c and as previously described such that the insertion plate 8 lies flush with the rear face 4 of the housing 19 as shown in FIG. 6d.

There is therefore provided in accordance with the invention a mounting means which is range taking in it's ability to receive storage media of differing dimensions and ensure that the same are held in the correct position with respect to the power and/or data connections of the apparatus with which the same is to be used.

The invention claimed is:

1. Apparatus for the processing of data, said apparatus including one or more processors that process data, a data storage media which can be selectively mechanically located and connected with said apparatus via mounting means to allow the transfer of data between the storage media and the processing means when connected, wherein the said mounting means includes biasing means in the form of one or more spring members which contact directly with the storage media, or a housing therefore, to ensure that the storage media, which includes one or more connections, when inserted into the mounting means, is moved into the required location for connection to a corresponding connection means of the apparatus, wherein the one or more spring members depend inwardly into a cavity of the mounting means and exert a force against the storage media in a direction that is perpendicular to a direction in which the storage media is inserted into the mounting means.

2. Apparatus according to claim 1 wherein the storage media has a hard disk drive.

3. Apparatus according to claim 1 wherein the biasing means allows the mounting means to be range raking for storage media with respect to at least one dimension parameter of the storage media.

4. Apparatus according to claim 3 wherein the said at least one parameter is the depth or thickness of the storage media.

5. Apparatus according to claim 4 wherein the said depth or thickness which can be accommodated is within a predefined depth or thickness range and thereby allow storage media with a depth or thickness within that range to be inserted in the mounting means and positioned to allow power and data connection to be achieved.

6. Apparatus according to claim 1 wherein the storage media is engaged with an insertion plate which forms an outer face of part of a housing of the apparatus when the storage media is in position.

7. Apparatus according to claim 4 wherein the storage media is fully enclosed within an apparatus housing.

8. Apparatus according to claim 4 wherein the storage media is fully enclosed within an apparatus housing.

9. Apparatus according to claim 1 wherein connections are located at the opposing ends of the mounting means from that at which the insertion plate is located.

10. Apparatus according to claim 1 wherein guide means are provided to guide the sliding movement of the storage media into the mounting means.

11. Apparatus according to claim 8 wherein the guide means and biasing means are located so as to contact the storage media at locations on the storage media which are known to be resistant to damage.

12. Mounting means for a data storage media which can be selectively mechanically located and connected with apparatus in which the mounting means is provided, the said mounting means includes biasing means to act on the storage media when inserted into the mounting means to move the same into and be retained in the required location for connection to connection means of the apparatus wherein the biasing means are provided in the form of one or more spring members which contact directly with the storage media, or a housing therefore, wherein the one or more spring members depend inwardly into a cavity of the mounting means and exert a force against the storage media in a direction that is perpendicular to a direction in which the storage media is inserted into the mounting means.

\* \* \* \* \*